United States Patent
Sugiyama

(10) Patent No.: US 11,159,708 B2
(45) Date of Patent: Oct. 26, 2021

(54) IMAGING APPARATUS, ACCESSORY APPARATUS, AND CONTROL METHOD

(71) Applicant: CANON KABUSHIKI KAISHA, Tokyo (JP)

(72) Inventor: Kazumichi Sugiyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/453,689

(22) Filed: Jun. 26, 2019

(65) Prior Publication Data

US 2020/0007739 A1    Jan. 2, 2020

(30) Foreign Application Priority Data

Jun. 27, 2018 (JP) .............................. JP2018-121914

(51) Int. Cl.
| | |
|---|---|
| *H04N 5/232* | (2006.01) |
| *G03B 17/14* | (2021.01) |
| *H04N 5/225* | (2006.01) |

(52) U.S. Cl.
CPC ......... *H04N 5/23203* (2013.01); *G03B 17/14* (2013.01); *H04N 5/2254* (2013.01); *H04N 5/232411* (2018.08)

(58) Field of Classification Search
CPC .............................................. H04N 5/232411

USPC ......................................................... 348/360
See application file for complete search history.

(56) References Cited

U.S. PATENT DOCUMENTS

2009/0244360 A1* 10/2009 Ueda .................. H04N 5/23209
                                                              348/360

FOREIGN PATENT DOCUMENTS

| JP | 2003-304419 A | 10/2003 |
| JP | 2010103599 | * 5/2010 |

* cited by examiner

*Primary Examiner* — Joel W Fosselman
(74) *Attorney, Agent, or Firm* — Cowan, Liebowitz & Latman, P.C.

(57) ABSTRACT

An imaging apparatus to which an accessory apparatus including a plurality of operation members is detachably attached includes a camera communicator configured to provide a communication path with the accessory apparatus, and a camera controller configured to communicate with the accessory apparatus via the camera communicator, and to transfer to a sleep state with the accessory apparatus when none of the accessory apparatus and the imaging apparatus are operated in a normal operation state. The camera controller designates a specific operation member among a plurality of operation members for the accessory apparatus. The camera controller in the sleep state returns to the normal operation state when receiving a communication from the accessory apparatus corresponding to an operation of the specific operation member.

14 Claims, 12 Drawing Sheets

IMAGING APPARATUS, ACCESSORY APPARATUS, AND CONTROL METHOD

BACKGROUND OF THE INVENTION

Field of the Invention

The present invention relates to an imaging system that includes an imaging apparatus (referred to as a camera hereinafter) and an accessory apparatus (referred to as an accessory hereinafter), such as an interchangeable lens and an intermediate adapter, which can communicate with each other.

Description of the Related Art

The above imaging system includes a plurality of operation members, such as a rotational operation ring (operationally operated ring) and a slide switch, used for an optical adjustment of a focal length, a focus state, a diaphragm (aperture stop), etc., and used to set the ISO speed and to turn on and off a function, such as the autofocus (AF) and image stabilization. In addition, the imaging system has an auto power-off function of automatically shifting the power supply of the entire imaging system to a power saving state (sleep state) when no operation is performed for a predetermined time. When detecting any operations in the sleep state, the imaging system returns to (or restarts) a normal operation state from the sleep state.

On the other hand, Japanese Patent Laid-Open No. ("JP") 2003-304419 discloses a camera that detects the (turning-on) operation of one of a plurality of operation members (start switch), and determines an operation mode to be started corresponding to the detected operation member.

However, the imaging system having the auto power-off function may not need to restart from the sleep state as any one of all operation members is operated, in order to improve the power saving performance or depending on the function of each operation member. The camera disclosed in JP 2003-304419 can select an operation mode when the camera is restarted, in accordance with the operation of the operation member, but cannot always select whether to restart.

SUMMARY OF THE INVENTION

The present invention provides an imaging apparatus, an accessory apparatus, and an imaging system, each of which can designate an operation member configured to returning the imaging apparatus or accessory apparatus in a sleep state to a normal operation state.

An imaging apparatus according to one aspect of the present invention to which an accessory apparatus including a plurality of operation members is detachably attached includes a camera communicator configured to provide a communication path with the accessory apparatus, and a camera controller configured to communicate with the accessory apparatus via the camera communicator, and to transfer to a sleep state with the accessory apparatus when none of the accessory apparatus and the imaging apparatus are operated in a normal operation state. The camera controller designates a specific operation member among a plurality of operation members for the accessory apparatus. The camera controller in the sleep state returns to the normal operation state when receiving a communication from the accessory apparatus corresponding to an operation of the specific operation member.

An accessory apparatus according to another aspect of the present invention attachable to and detachable from an imaging apparatus and including a plurality of operation members includes an accessory communicator configured to provide a communication path with the imaging apparatus, and an accessory controller configured to communicate with the imaging apparatus via the accessory communicator, and to transfer to a sleep state when receiving a sleep instruction from the imaging apparatus in a normal operation state. The accessory controller receives a designation of a specific operation member among the plurality of operation members from the imaging apparatus. The accessory controller in the sleep state performs, when detecting an operation of the specific operation member, a communication for returning the imaging apparatus from the sleep state to the normal operation state.

An imaging system including the above accessory apparatus and the above imaging apparatus also constitute another aspect of the present invention. A control method of the above imaging apparatus and a control method of the above accessory apparatus also constitute another aspect of the present invention. A non-transitory computer-readable storage medium storing a computer program for causing the imaging apparatus or the accessory apparatus to execute processing in accordance with the above control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description be given of embodiments according to the present invention.

First Embodiment

Figure 1:
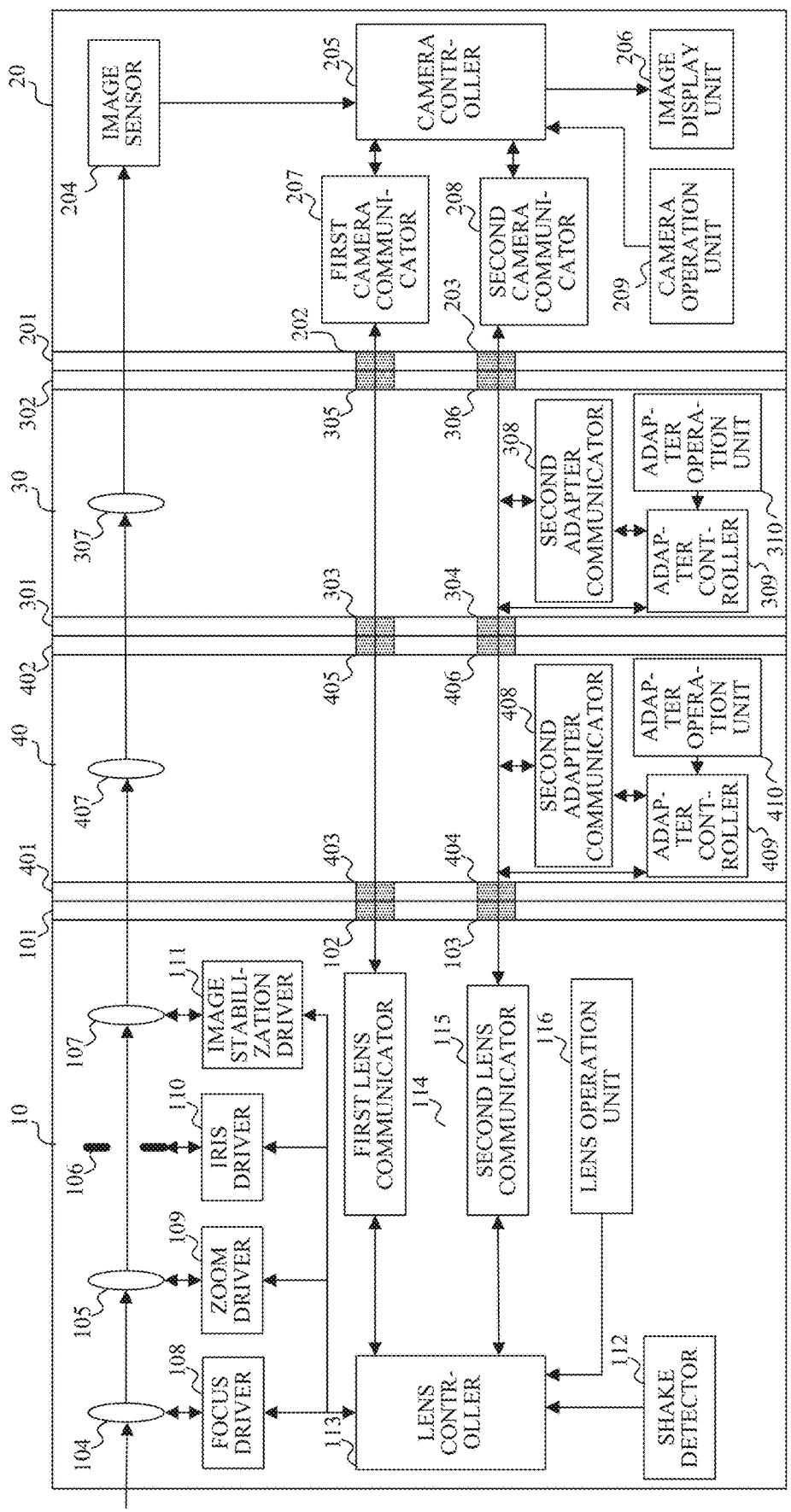
FIG. 1 is a block diagram showing a configuration of a camera system according to a first embodiment of the present invention.

A first embodiment of the present invention discusses an imaging system (referred to as a camera system hereinafter) in which, as illustrated in FIG. 1, a plurality of accessory apparatuses including an interchangeable lens 10 and a plurality of intermediate adapters 30 and 40 detachably and communicably attached to a camera body 20 as an imaging apparatus. The intermediate adapters 30 and 40 include a teleconverter or wide converter configured to change a focal length, a mount converter configured to change a flange back length, and an ND filter having a light attenuation function. The interchangeable lens 10 may be attached directly to the camera body 20 (without the intermediate adapters 30 and 40), or even one intermediate adapter may be provided between the camera body 20 and the interchangeable lens 10.

A mount 202 of the camera body 20 and a mount 302 of the intermediate adapter 30 are mechanically and electrically coupled to each other, and a mount 301 of the intermediate adapter 30 and a mount 402 of the intermediate adapter 40 are mechanically and electrically coupled to each other. The mount 401 of the intermediate adapter 40 and the mount 101 of the interchangeable lens 10 are mechanically and electrically coupled to each other. The camera body 20 includes a first camera communicator 207, a second camera communicator 208, and a camera controller 205. The first camera communicator 207 and the second camera communicator 208 constitute a camera communicator.

The interchangeable lens 10 includes a first lens communicator 114, a second lens communicator 15, and a lens controller (accessory controller) 113. The first lens communicator 114 and the second lens communicator 115 constitute an accessory communicator. The intermediate adapters 30 and 40 respectively include second adapter communicators 308 and 408 as accessory communicators, and adapter controllers (accessory controllers) 309 and 409.

A first communication path is provided using first communication contacts 202, 305, 303, 405, 403, and 102 on the mounts 201, 302, 301, 402, 401, and 101 between the first camera communicator 207 and the first lens communicator 114. The camera controller 205 and the lens controller 113 perform the "one-to-one" communication (also referred to as a first communication hereinafter) via the first communication path. Between the second camera communicator 208, the second adapter communicators 308 and 408, and the second lens communicator 115, a second communication path is provided using second communication contacts 203, 306, 304, 406, 404, and 103 provided on the mounts 201, 302, 301, 402, 401, and 101. The camera controller 205 performs the "one-to-many" communication (also referred to as a second communication hereinafter) with the lens controller 113 and the adapter controllers 309 and 409 via the second communication path. The contacts have a plurality of communication terminals. Details will be described later.

The first communication and the second communication performed with different communication paths can transmit an instruction and a request from the camera body 20 to the interchangeable lens 10 at more appropriate timings, for example, in the first communication than the first communication and the second communication performed with the same communication path. Thereby, the camera body 20 can control the interchangeable lens 10 at a higher speed and with a higher accuracy.

The interchangeable lens 10 includes an imaging optical system. The imaging optical system includes, in order from an unillustrated object side, a focus lens 104 for focusing, a zoom lens (magnification-varying lens) 105 for magnification variations, a diaphragm (iris) unit 106 for adjusting a light amount, and an image stabilization lens 107 for reducing an image blur. Each of the focus lens 104 and the zoom lens 105 is driven by a focus driver 108 and a zoom driver 109 in the optical axis direction as the direction in which the optical axis of the imaging optical system extends. Each of the focus driver 108 and zoom driver 109 includes an actuator, such as a stepping motor and its drive circuit.

The diaphragm unit 106 includes a plurality of unillustrated aperture blades, and adjusts the light amount by driving them in an opening and closing direction through the iris driver 110. The iris driver 110 includes an actuator, such as a stepping motor, and its drive circuit.

The image stabilization lens 107 is shifted in a direction orthogonal to the optical axis of the imaging optical system by an image stabilization driver 111 according to camera shake, such as a manual vibration. The image stabilization driver 111 includes an actuator, such as a voice coil motor, and its drive circuit. The interchangeable lens 10 includes a shake for vibration) detector 112, such as a gyro sensor for detecting a camera shake.

The interchangeable lens 10 has a lens operation unit 116. The lens operation unit 116 includes a plurality of operation members, such as a lens operation ring, a switch, a button, a dial, and a touch panel, which can be rotated by the user around the optical axis. The operation of the lens operation unit 116 is detected by the lens controller 113.

The lens controller 113 controls the operation of each component in the interchangeable lens 10. More specifically, the lens controller 113 receives a control instruction and a transmission request instruction transmitted from the camera body 20 through the first communication and the first lens communicator 114, and performs a lens control corresponding to the control instruction. The lens controller 113 transmits, to the camera body 20, optical information of the imaging optical system corresponding to the transmission request instruction transmitted from the camera body 20 through the first communication and operation information of the lens operation unit 116. The lens controller 113 controls the shift drive (or the image stabilization operation) of the image stabilization lens 107 via the image stabilization driver 111 based on the shake signal from the shake detector 112.

The intermediate adapters 30 and 40 include optical members 307 and 407 such as lenses, adapter controllers 309 and 409, and adapter operation units 310 and 410. The adapter operation units 310 and 410 include a plurality of operation members, such as an adapter operation ring, a switch, a button, a dial, and a touch panel, that can be rotated by the user around the optical axis. The operations in the adapter operation units 310 and 410 are detected by the adapter controllers 309 and 409.

The adapter controllers 309 and 409 control the operations of the components in the intermediate adapters 30 and 40, respectively. The adapter controllers 309 and 409 receive the control instruction and the transmission request instruction transmitted from the camera body 20 through the second communication and the second adapter communicators 308 and 408, respectively. The adapter controllers 309 and 409 perform an adapter control corresponding to the control instruction. The adapter controllers 309 and 409 transmit, to the camera body 20, optical information of the intermediate adapters 30 and 40 corresponding to the transmission request instruction transmitted from the camera body 20 through the second communication and operation information of the adapter operation units 310 and 410 through second communication.

The camera body 20 includes an image sensor 204, such as a CCD sensor and a CMOS sensor, a camera controller 205, and an image display unit 206. The image sensor 204 is a photoelectric conversion device, such as a CMOS sensor, and captures (photoelectrically converts) an object image formed by the imaging optical system. The image display unit 206 displays an image signal generated by imaging as a live-view image used for a confirmation of a composition, a focus state, and the like, and reproduces and displays an image recorded by imaging.

The camera controller 205 controls the operation of each component in the camera body 20 according to the operation of the camera operation unit 209 such as an unillustrated imaging instruction switch and various setting switches. For example, the exposure time of the image sensor 204 is controlled for an exposure control. In addition, the camera controller 205 transmits a control instruction to the interchangeable lens 10 and the intermediate adapters 30 and 40 through the first communication. For example, the camera controller 205 transmits a control command regarding a zoom control to the interchangeable lens 10 in response to the operation of the zoom switch included in the camera operation unit 209. The camera controller 205 transmits, to the interchangeable lens 10, a control command relating to a light amount adjustment control according to the luminance information of the image signal, and a control command relating to a focus control according to the focus information obtained from the image sensor 204.

The camera controller 205 transmits a transmission request command for acquiring optical information to the interchangeable lens 10 and the intermediate adapters 30 and 40, and receives the lens optical information from the interchangeable lens 10 and adapter optical information from the intermediate adapter 30 and 40. The camera controller 205 receives operation information of the lens and the adapter operation units 116, 310, and 410 from the interchangeable lens 10 and the intermediate adapters 30 and 40, and transmits the corresponding control command to the interchangeable lens 10 and the intermediate adapter 30 and 40. In other words, in the normal operation state, the camera controller 205 operates according to the operations of a plurality of operation members provided to the camera body 20, the interchangeable lens 10, and the intermediate adapters 30 and 40.

Figure 2A:
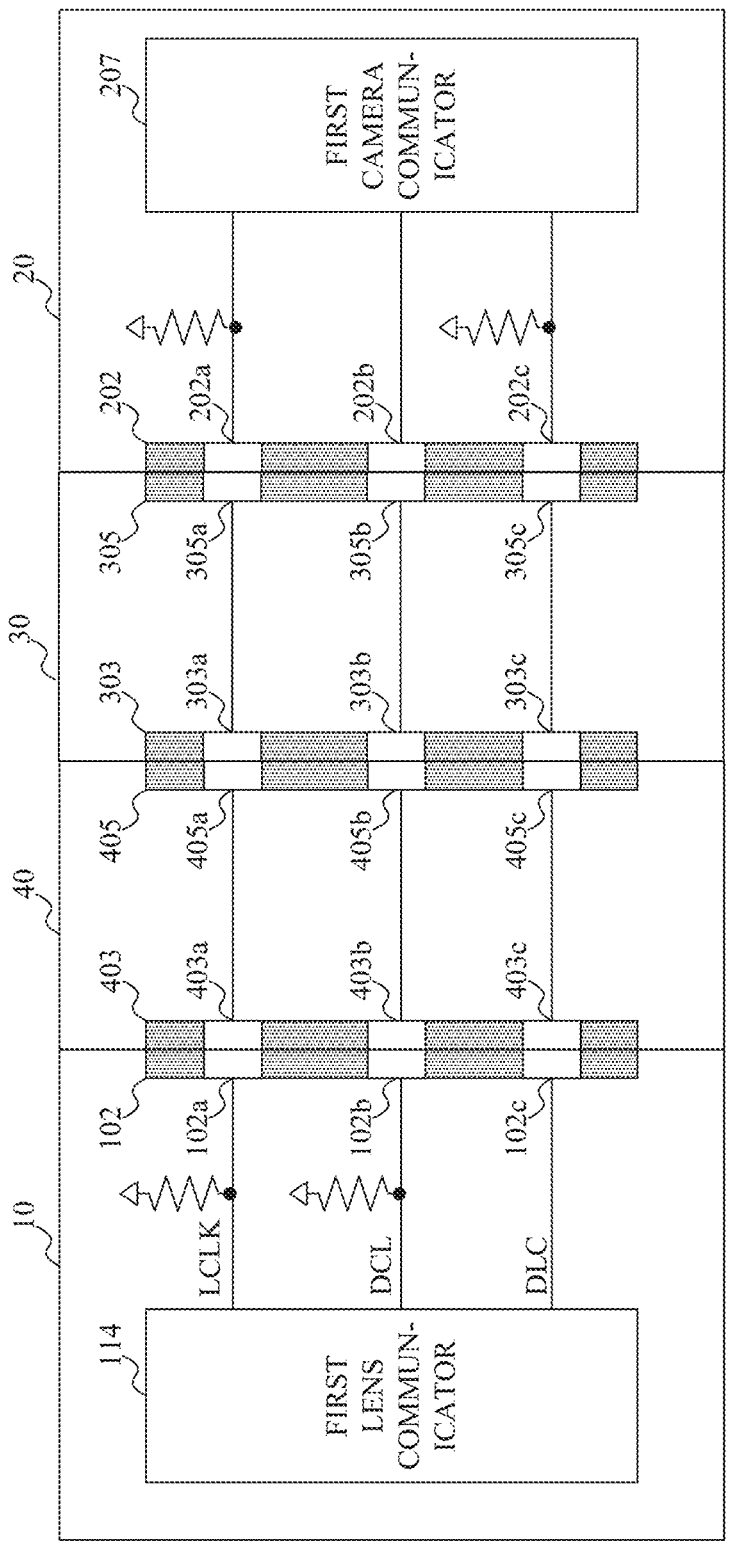
FIGS. 2A and 2B explain a first communication according to the first embodiment.
Figure 2B:
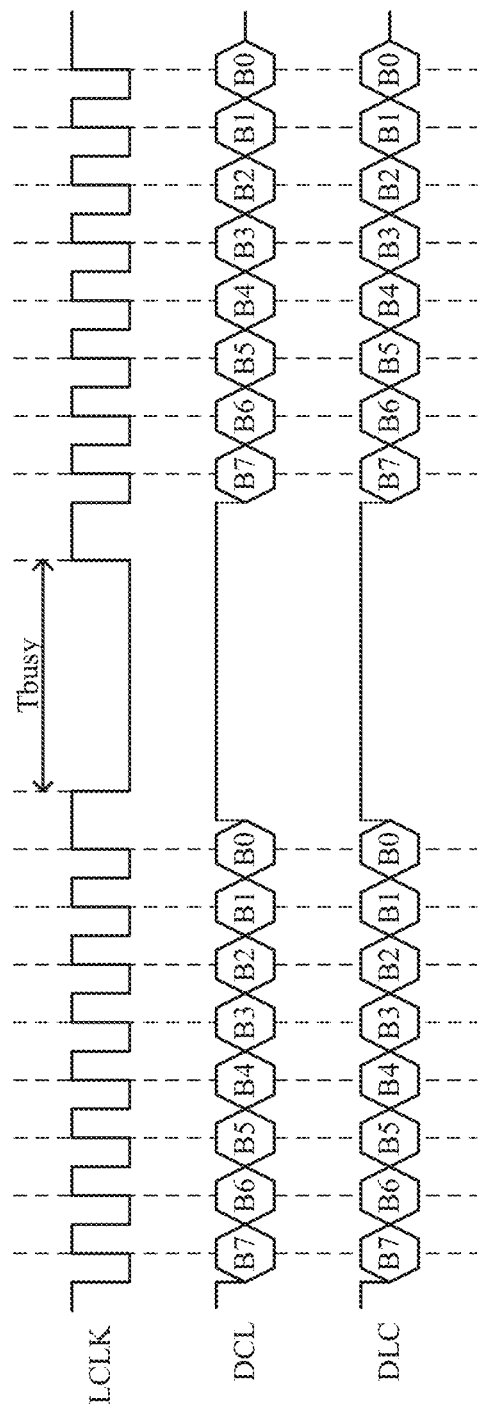

Referring now to FIGS. 2A and 2B, a description will be given of the first communication. In this illustrative description, the first communication is a clock synchronous communication. FIG. 2A illustrates a configuration for performing the first communication. The first communication contacts 102, 403, 405, 303, 305, and 202 include first LCLK terminals 102a, 403a, 405a, 303a, 305a, and 202a as a terminal of a clock line LCLK. The clock line LCLK is a signal line for a clock signal output from the first camera communicator 207 to perform the clock synchronous communication. The first communication contacts 102, 403, 405, 303, 305, and 202 include first DCL terminals 102b, 403b, 405b, 303b, 305b, and 202b as terminals of a data line DCL. The data line DCL is a signal line through which a data signal of the clock synchronous communication is output from the first camera communicator 207. The first communication contacts 102, 403, 405, 303, 305, and 202 include the first DLC terminals 102c, 403c, 405c, 303c, 305c, and 202c as terminals of the data line DLC. The data line DLC is a signal line through which a data signal of the clock synchronous communication is output from the first lens communicator 114.

As illustrated in FIG. 2A, the clock line LCLK and the data line DCL are pulled up in the interchangeable lens 10. The clock line LCLK and the data line DLC are pulled up in the camera body 20.

The clock line LCLK, the data line DCL, and the data line DLC in the intermediate adapters 30 and 40 are short-circuited between the first communication contacts 303 and 305 and between the first communication contacts 403 and 405, respectively.

FIG. 2B illustrates signal waveforms of the clock line LCLK, the data line DCL, and the data line DLC in the first communication. The first camera communicator 207 outputs a clock signal to the clock line LCLK, and outputs 8-bit data from B7 to B0 to the data line DCL in synchronization with the leading edge of the clock signal. The first lens communicator 114 outputs 8-bit data from B7 to B0 to the data line DLC in synchronization with the leading edge of the clock signal. The first camera communicator 207 receives 8-bit data from B7 to B0 from the data line DLC in synchronization with the leading edge of the clock signal. The first lens communicator 114 receives 8-bit data from B7 to B0 from the data line DCL in synchronization with the leading edge of the clock signal. Thus, the first camera communicator 207 and the first lens communicator 114 can transmit and receive data to and from each other.

When receiving the 8-bit data from B7 to B0 from the data line DCL, the first lens communicator 114 maintains low the clock signal LCLK for the time Tbusy, and releases a low state of the clock signal after the time Tbusy. The time Tbusy is a time period necessary for the interchangeable lens 10 to process the received data, and the first camera communicator 207 does not perform the next data transmission until the clock line LCLK changes from low to high after the data transmission. The first camera communicator 207 and the first lens communicator 114 perform data transmission and reception by the first communication by repeating the above processing.

Figure 10:
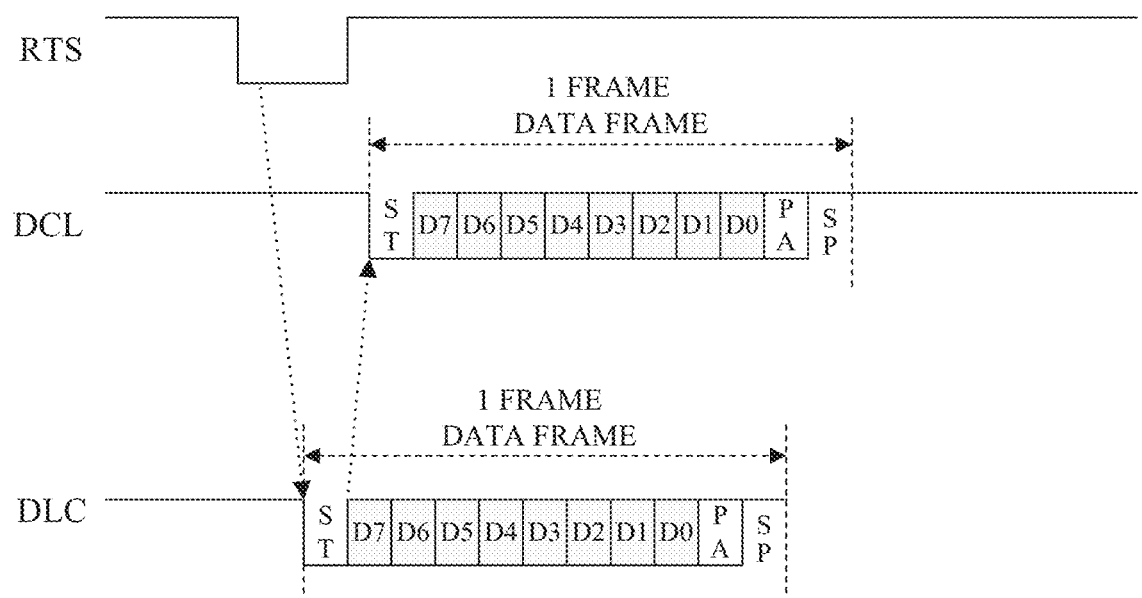
FIG. 10 illustrates a signal waveform communicated between a first camera communicator and a first lens communicator by an asynchronous method according to this embodiment.

While an example of the first communication as the clock synchronous communication has been described above, the asynchronous communication may be employed. Referring now to a description of a signal waveform communicated between the first camera communicator 207 and the first lens communicator 114 in the asynchronous manner with the configuration described with reference to FIG. 2A, FIG. 10 illustrates a signal waveform in a three-line asynchronous communication. In the three-line asynchronous communication, the clock line LCLK is used for a transmission request line RI'S. The transmission request line RTS is a signal line for transmitting a signal for controlling timings of a communication by the data line DCL and a communication by the data line DLC from the first camera communicator 207 to the first lens communicator 114.

For example, it is used for a notice, such as a transmission request (transmission instruction) of lens data and a switch request (switching instruction) of communication processing described later from the first camera communicator 207 to the first lens communicator 114. The notice on the transmission request channel is made by switching the signal level (voltage level) on the transmission request channel between high (first level) and low (second level). In the following description, a signal supplied to the transmission request line RTS will be referred to as a transmission request signal RTS.

The transmission request signal RTS is sent from the first camera communicator 207 as a communication master to the first lens communicator 114 as a communication slave. When the first lens communicator 114 receives the transmission request signal RI'S, as illustrated in FIG. 10, the signal level of the lens data signal DLC is set to be low for one bit period so as to inform the first camera communicator 207 of the transmission start of one frame of the lens data signal DLC. This one bit period is called a start bit ST indicating the start of one frame. In other words, the data frame starts from this start bit ST. The start bit ST is provided to the first bit for each frame of the lens data signal DLC.

Next, the first lens communicator 114 transmits one-byte lens data in an 8-bit period from the next second bit to the ninth bit. The bit arrangement of the data starts with the most significant data D7 in the MSB first format, continues in order of data D6 and data D5, and ends to the least significant data D0. Then, the first lens communicator 114 adds one-bit parity information PA to the 10th bit, and sets the signal level of the lens data signal DLC to high in the period of the stop bit SP indicating the end of one frame. Thereby, the data frame period starting with the start bit ST ends. This configuration can perform the first communication by the asynchronous communication.

Figure 11:
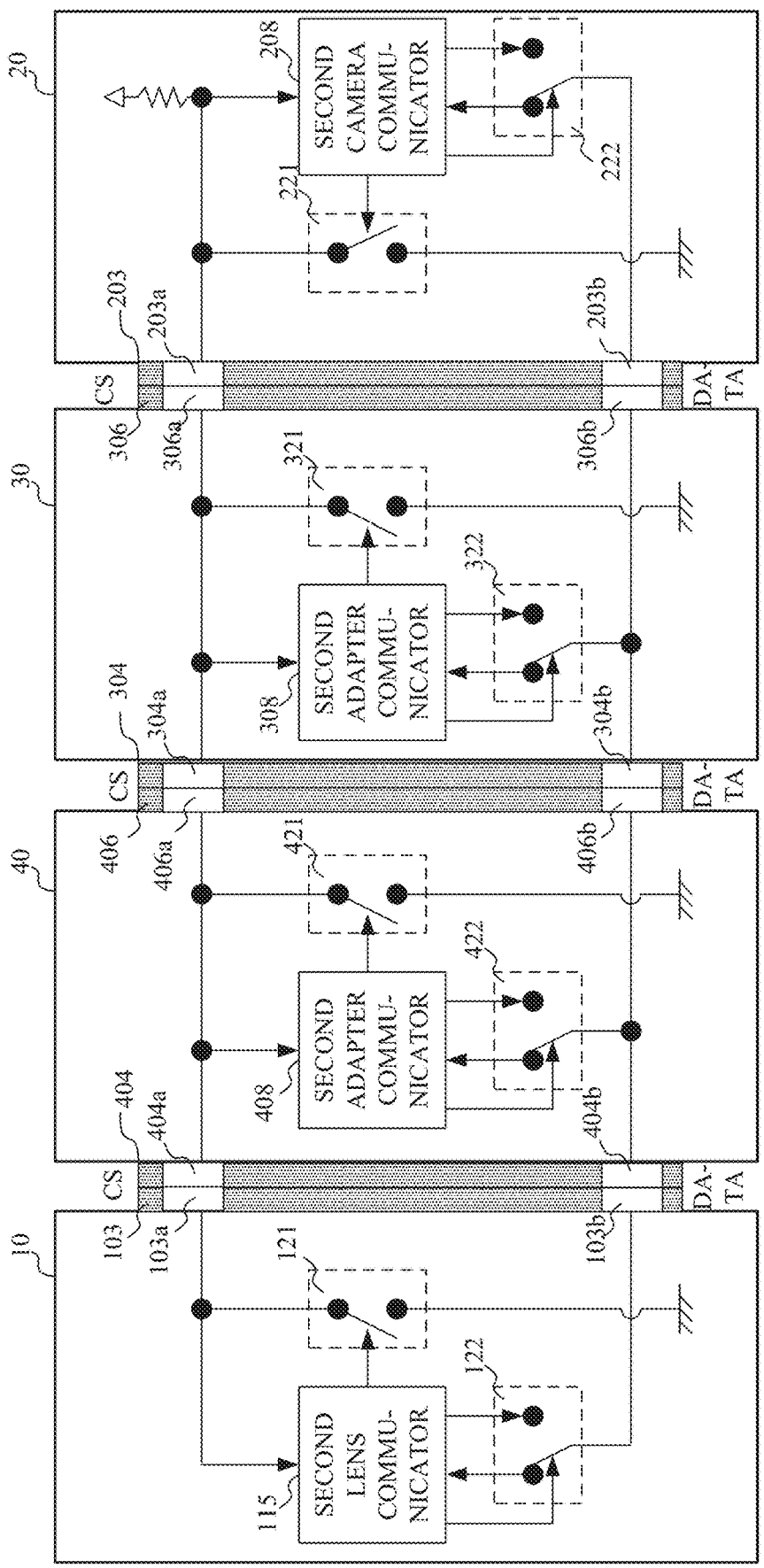
FIG. 11 explains a second communication according to the first embodiment.

Referring now to FIG. 11, a description will be given of the second communication. A description will be given of one communication circuit capable of the "one-to-many" communication configured among the camera body 20, the interchangeable lens 10, the intermediate adapter 30, and the intermediate adapter 40. The communication circuit is not limited to this example as long as the "one-to-many" communication is available. When there are a plurality of communication circuits, another communication circuit may be used for the "one-to-one" communication, such as the clock synchronous serial communication and the DART communication.

The second camera communicator 208, the second lens communicator 115, and the second adapter communicators 308 and 408 are connected to each other via the contacts as in the first communication. More specifically, they are connected via the second communication contacts 103, 404, 406, 304, 306, and 203. In this embodiment, the second communication contacts 103, 404, 406, 304, 306, and 203 include CS signal terminals 103a, 404a, 406a, 304a, 306a, and 203a and DATA signal terminals 103b, 404b, 406b, 304b, 306b, and 203b, respectively. The second camera communicator 208, the second lens communicator 115, and the second adapter communicator 308 use the CS signal line connected via the CS signal terminal and the DANA signal line connected via the DATA signal terminal to provide communications.

The camera communication circuit includes a ground switch and an input/output selector switch 222. The lens communication circuit includes a around switch 121 and an input/output switch 122. The adapter communication circuit includes ground switches 321 and 421 and input/output selector switches 322 and 422.

The CS signal line is a signal line for propagating a signal for performing a flow control of the communication. The DATA signal line is a signal line for propagating data to be transmitted and received.

The CS signal line is connected to the second camera communicator 208, the second adapter communicator 308, and the second lens communicator 115, and can detect the (high or low) state of the signal line. The CS signal line is pull-up connected to an unillustrated power supply in the camera body. The CS signal line can be connected to the GND via the ground switch 121 of the interchangeable lens 10, the ground switch 221 of the camera body 20, and the ground switches 321 and 421 of the intermediate adapters (open drain connection). With this configuration, each of the interchangeable lens 10, the camera body 20, and the intermediate adapters 30 and 40 can set the state of the CS signal line to be low by turning on (connecting) the ground switch. On the other hand, the state of the CS signal line can be set to be high when all of the interchangeable lens 10, the camera body 20, and the intermediate adapters 30 and 40 turn off (cut oft) their connection switches. The CS signal line is used to distinguish the broadcast communication from the P2P communication, or to switch the communication direction in the P2P communication.

The DATA signal line is a single-line bidirectional data transmission line that can be used by switching the data propagation direction. The DATA signal line can be connected to the second lens communicator 115 via the input/output switch 122 of the interchangeable lens 10. The DATA signal line can be connected to the second camera communicator 208 via the input/output switch 222 of the camera body 20. The DATA signal line can be connected to the second adapter communicators 308 and 408 via the input/output switches 322 and 422 of the intermediate adapters 30 and 40, respectively. Each microcomputer includes a data output unit (CMOS method) for transmitting data and a data input unit (CMOS method) for receiving data. Operating the input/output switch can select whether to connect the DATA signal line to the data output unit or to the data input unit. With this configuration, when the interchangeable lens 10, the camera body 20, and the intermediate adapters 30 and 40 each transmit data, the interchangeable lens 10, the camera body 20, and the intermediate adapters 30 and 40 operate the input/output switch so as to connect DATA signal line to the data output unit, thereby enabling the data transmission. On the other hand, when the interchangeable lens 10, the camera body 20, and the intermediate adapters 30 and 40 each receive data, they operate the input/output switch so as to connect the DATA signal line to the data input unit, thereby enabling the data reception.

A description will be given of the broadcast communication and the P2P communication performed by the CS signal and the data signal. The CS signal line is used as a trigger for broadcast communication because it turns into a low level when any unit is connected to the GND.

The broadcast communication starts when the camera body as a main body of the communication pulls the CS signal line low. It is determined that the data received by the accessory via the DATA line is the broadcast data when the CS signal line is low.

Each accessory can request the camera body for the broadcast communication by pulling the CS signal line low.

The unit that has detected the low level of the CS signal line can notify other units that processing for the broadcast communication is continuing by turning on its own ground switch during the broadcast processing. The DATA signal line of the accessory may basically maintain the reception state by defining that the 2 $k^{th}$ communication starts with the broadcast communication and ends with the broadcast communication. When the camera performs the P2P communication with the accessory, the accessory as a communication counterpart is initially designated (or set) by the broadcast communication. The camera that has completed the transmission of the broadcast communication and the designated accessory perform the P2P communication.

In the P2P communication, the camera initially transmits the data, and the accessory that receives the data transmits the data to the camera. Thereafter, this is alternately performed. The P2P communication is distinguished from the broadcast communication in that the CS signal in the communication is maintained high. The CS signal in the P2P communication is used for a busy signal. In other words, the camera and accessory are set to be low so as to notify the counterpart that the data transmission from it has been completed, and are set to be high so as to notify that they are ready to receive the data. When the P2P communication ends, the camera broadcasts the end of the P2P communication.

Thus, the camera can perform the data communication with the plurality of accessories through the two communication lines.

While FIG. 12 illustrates an illustrative communication circuit, another communication circuit configuration may be used. For example, the CS signal line may be pulled down to the GND in the camera body 20, and connected to the unillustrated power supply via the ground switch 121 of the interchangeable lens 10, the ground switch 221 of the camera body 20, and the ground switches 321 and 421 of the intermediate adapters 30 and 40, The DATA signal line may be always connected to each data input unit, and the connection and disconnection between the DATA signal line and each data output unit may be operated by a switch.

The second communication may be performed by the same communication method as the first communication, or may be realized by the bidirectional asynchronous communication, the master/slave method, the token passing method, or the like.

Figure 3:
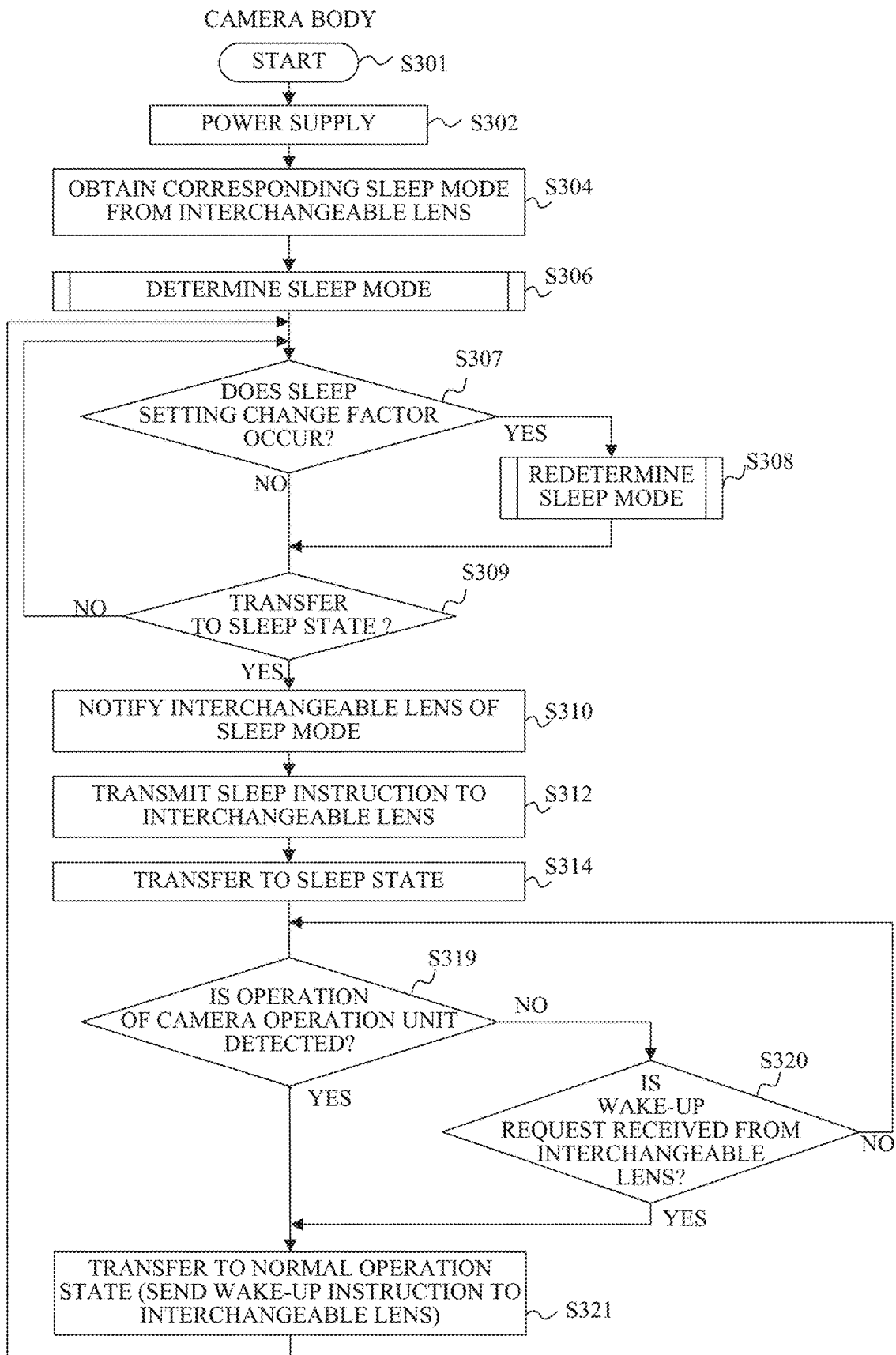
FIG. 3 is a flowchart showing wake-up operation setting processing for a camera body according to the first embodiment.
Figure 4:
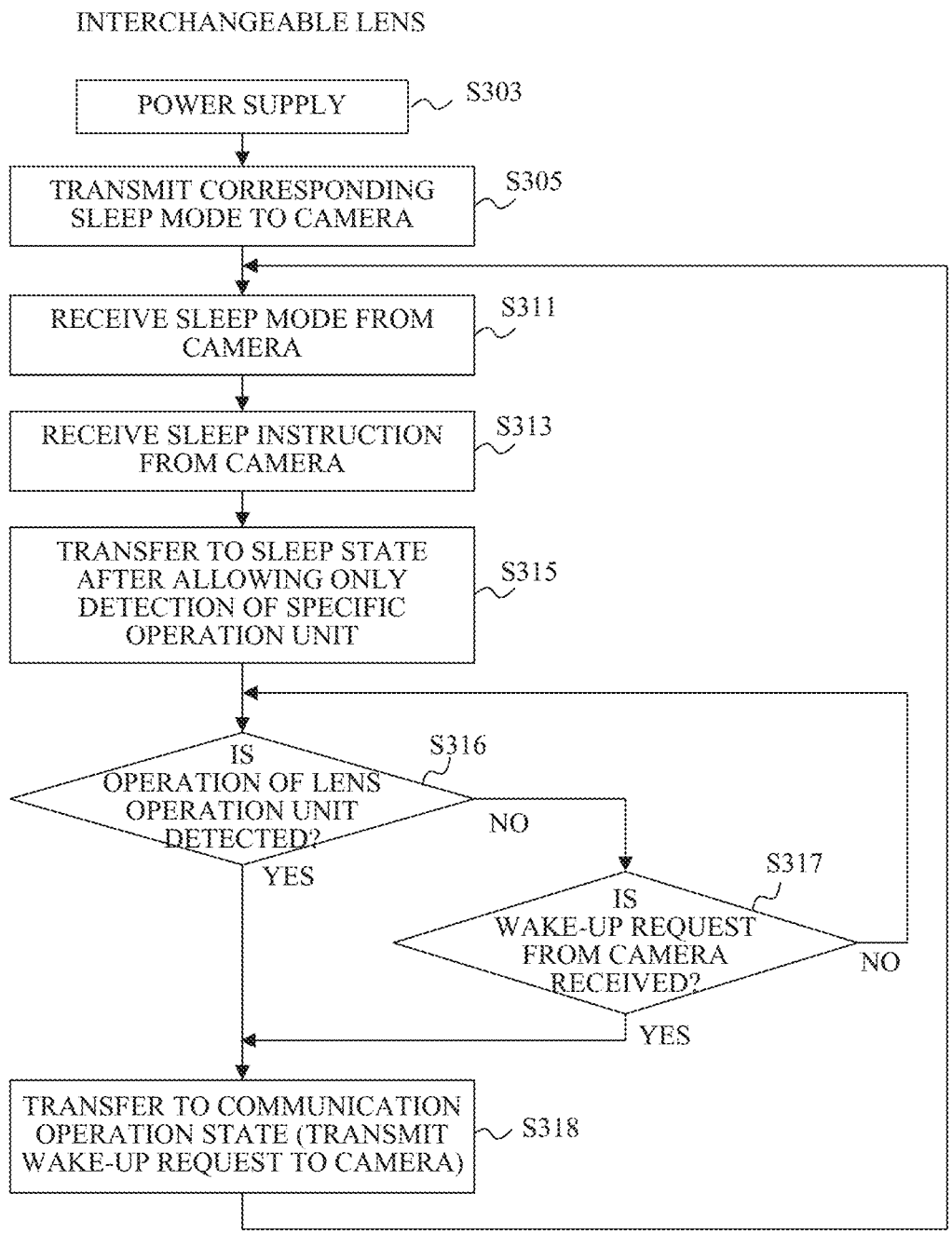
FIG. 4 is a flowchart showing wake-up operation setting processing for an interchangeable lens according to the first embodiment.

Referring now to FIGS. 3 and 4, a description will be given of processing of shifting from the normal operation state to the sleep state with the interchangeable lens 10 when only the interchangeable lens 10 is attached to the camera body 20, and the camera body 20 designates the wake-up (or sleep release) operation of the interchangeable lens 10. The sleeve state can also be referred to as a standby state, and is a power saving state having a power consumption lower than that in the normal operation state. The designation of the wake-up operation of the interchangeable lens 10 means the designation of the specific operation member that causes the camera system to return from the sleeve state to the normal operation state by its operation among the plurality of operation members of the interchangeable lens 10 (or its operation for releasing the sleep state). When the wake-up operation is performed in the interchangeable lens 10, the lens controller 113 transmits a communication request to the camera controller 205, and the camera body 20 that receives it returns from the sleep state to the normal operation state.

FIGS. 3 and 4 illustrate a series of processes in which the camera body 20 to which the interchangeable lens 10 is mounted is powered on, and then the camera body 20 and the interchangeable lens 10 shift to the sleep state and then return to the normal operation state in response to e wake-up operation in the interchangeable lens 10. The camera body 20 can set a plurality of sleep modes different from each other in the wake-up operation. The sleep mode indicates Which operation member among the plurality of operation members of the lens operation unit 116 provided in the interchangeable lens 10 is used in the sleep state to return to the normal operation state. In the following description, S stands for the step. The camera controller 205 and the lens controller 113 execute this processing in accordance with a computer program.

In S301, as the camera body 20 is powered on, the camera controller 205 proceeds to S302 and powers on the interchangeable lens 10. In S303, the interchangeable lens 10 (lens controller 113) is started by the power supply from the camera body 20.

Next, in S304, the camera controller 205 performs an initial communication with the lens controller 113 through the first communication. In the initial communication, the camera controller 205 acquires, from the lens controller 113, identification (ID) information unique to the interchangeable lens 10, lens optical information, and information indicating the function of the interchangeable lens 10. The information indicating the function of the interchangeable lens 10 includes information indicating the functions of the plurality of operation members included in the lens operation unit 116. The information indicating the functions of the plurality of operation members may be included in the ID information.

In the initial communication, the camera controller 205 requests the lens controller 113 to transmit the corresponding sleep mode of the interchangeable lens 10. The lens controller 113 that has received the transmission request transmits the corresponding sleep mode to the camera controller 205 in S305, The corresponding sleep mode of the interchangeable lens 10 indicates a specific operation member that can detect an operation in the sleep state among a plurality of operation members of the interchangeable lens 10 (lens operation unit 116).

One method of expressing the sleep mode previously allocates bits 0 to 7, as shown in Table 1-1, to each of the plurality of operation members provided in the interchangeable lens 10, and sets 1 to the bit corresponding to the specific operation member. As illustrated in Table 1-2, the sleep mode may be set so that the number of specific operation members increases from one specific operation member indicating the bit 0 in order of the bits 1 to 7. This embodiment describes the sleep mode shown in Table 1-1.

In Tables 1-1 and 1-2, an "AM/MF switch" indicates a switch that serves to select the autofocus and manual focus, and an "IS switch" that serves to turn on and off the image stabilization operation. A "focus ring" indicates a lens operation ring to which the function of operating the manual focus is assigned. A "control ring" indicates an electronic control ring (which will be described later) as a lens operation ring to which a change function is assigned, such as an F-number (aperture value), a shutter speed, a sensitivity of the image sensor 204, and an exposure correction value. A "magnification variation ring" indicates a lens operation ring to which a function of varying a zoom magnification is assigned, and a "variable ND variation ring" is a lens operation ring to which a function of changing an insertion degree of an ND filter into an imaging light path or of changing an attenuation factor is assigned. A "•• switch" indicates a switch having a function other than that of the "AM/MF switch" or the "IS switch", a "▲▲ ring" indicates a lens operation ring to which a function other than that of the focus ring, the control ring, the magnification-varying ring, or the variable ND variation ring is assigned.

TABLE 1-1

| Sleep Mode | Detectable Operation member |
|---|---|
| Bit0 | AF/MF switch |
| Bit1 | IS Switch |
| Bit2 | Focus Ring |

TABLE 1-1-continued

| Sleep Mode | Detectable Operation member |
|---|---|
| Bit3 | Control Ring |
| Bit4 | Magnification Varying Ring |
| Bit5 | Variable ND Variation Ring |
| Bit6 | ●● Switch |
| Bit7 | ▲▲ Ring |

TABLE 1-2

| Sleep Mode | Detectable Operation member |
|---|---|
| Bit0 | AF/MF switch |
| Bit1 | (Member of Bit0) + IS Switch |
| Bit2 | (Member of Bit1) + Focus Ring |
| Bit3 | (Member of Bit2) + Control Ring |
| Bit4 | (Member of Bit3) + Magnification Varying Ring |
| Bit5 | (Member of Bit4) + Variable ND Variation Ring |
| Bit6 | (Member of Bit5) + ●● Switch |
| Bit7 | (Member of Bit6) + ▲▲ Ring |

Next, in S306, the camera controller 205 determines the sleep anode to be set for the interchangeable lens 10, In order to determine the sleep mode, in addition to the corresponding sleep mode of the interchangeable lens 10 acquired in S304, the functions assigned to the plurality of operation members of the lens operation unit 116 and a function determination result of whether the function is effective in the setting of the current camera body 20 etc, is added. Details of S306 will be described later with reference to FIG. 5. At this stage, the camera controller 205 does not notify the lens controller 113 of the determined sleep mode.

The flow from the next S307 to S309 and back to S307 illustrates processing performed by the camera controller 205 in the normal operation state of the camera system. The camera controller 205 returns to S307 without transferring to the sleep state when the sleep setting change factor described later does not occur in the normal operation state (S307) and the user's operation on the camera system is performed during the predetermined time (S309).

On the other hand, when the sleep setting change factor occurs in the normal operation state (S307), the camera controller 205 proceeds to S308, redetermines the sleep mode, and proceeds to S309. The sleep setting change factor is an event in which it is necessary to redetermine the sleep mode, such as changing the function of each operation member or the imaging mode after the sleep mode is determined in S306.

If the user performs no operation on the camera system for a predetermined time in the normal operation state in S309, the camera controller 205 proceeds to S310 and notifies the lens controller 113 of the sleep mode determined in S306 or S308. The communication amount in the normal operation state can be reduced by notifying the interchangeable lens 10 of the sleep mode just before the interchangeable lens 10 shifts to the sleep state.

Next, in S311, the lens controller 113 that has received the notice of the sleep mode from the camera controller 205 compares the notified sleep mode with its corresponding sleep mode. If the notified sleep mode (or the specific operation member) accords with its corresponding sleep mode, the lens controller 113 sets the notified sleep mode as the current sleep mode of the interchangeable lens 10. At this time, the lens controller 113 may return a response, such as an ACK, to the camera controller 205.

When the sleep mode setting to the interchangeable lens 10 is normally performed in S311, the camera controller 205 proceeds to S312 and transmits a sleep instruction as a transfer instruction from the normal operation state to the sleep state to the lens controller 113. In S313, the lens controller 113 receives the sleep instruction. At this time, the lens controller 113 may return a response, such as an ACK, to the camera controller 205.

In S314 following S312, the camera controller 205 itself shifts from the normal operation state to the sleep state. The lens controller 113 also shifts to the sleep state in the notified sleep mode from the normal operation state in S315. At this time, the lens controller 113 shifts to the sleep state after allowing only the detection of the operation of the specific operation member designated in the sleep mode among the plurality of operation members included in the lens operation unit 116. In other words, the lens controller 113 does not detect the operation of the operation member other than the specific operation member in the sleep state.

On the other hand, when the operation of any operation members in the camera operation unit 209 is detected in S319, the camera controller 205 that has shifted to the sleep state in S314 proceeds to S321, and returns from the sleep state to the normal operation state. At this time, the camera controller 205 transmits a wake-up instruction to the lens controller 113 through the first communication.

The lens controller 113 in the sleep state maintains the sleep state until the operation of the specific operation member is detected in S316 or the wake-up instruction is received from the camera controller 205 in S317.

The lens controller 113 that has detected the operation of the specific operation member in S316 proceeds to S318, and shifts from the sleep state to the normal operation state. At this time, the lens controller 113 transmits a wake-up request to the camera controller 205 through the first communication. The wake-up request may request the camera controller 205 for a communication. In addition to transmitting the wake-up request (or communication request), the camera controller 205 may be required for the sleep release (or communication) by changing the signal level of the LCLK signal line or transmission request line RTS of the first communication path from the sleep state. In S317, the lens controller 113 having received the wake-up instruction from the camera controller 205 proceeds to S318 to shift from the sleep state to the normal operation state. After S318, the lens controller 113 returns to S311.

If no operation of any operation members in the camera operation unit 209 is detected in S319, the camera controller 205 proceeds to S320 and determines whether the wake-up request has been received from the lens controller 113. The camera controller 205 having received the wake-up request from the lens controller 113 proceeds to S321 and returns from the sleep state to the normal operation state. Thereafter, the camera controller 205 returns to S307.

Figure 5:
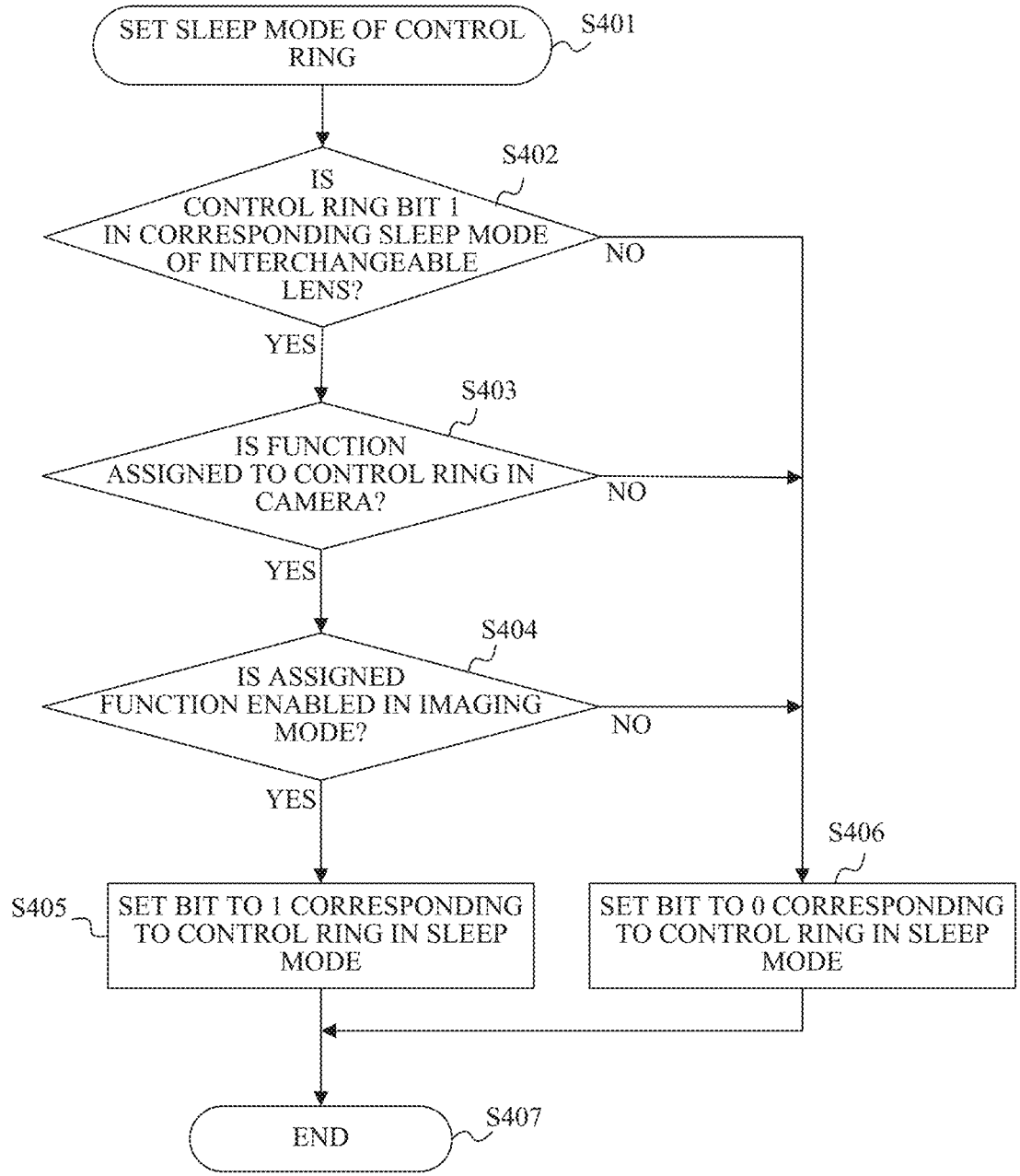
FIG. 5 is a flowchart showing sleep mode determination processing according to the first embodiment.

Referring now to FIG. 5, a description will be given of processing of determining the sleep mode in S306 as an example in which the electronic control ring of the interchangeable lens 10 (referred to as a lens control ring hereinafter) is designated as the specific operation member. This processing determines whether to set 1 or 0 to the bit (such as bit 3 in Table 1-1) corresponding to the "control ring" in the sleep mode based on the current setting of the camera body 20 or the like.

A function of changing the camera setting value selectable by the user is arbitrarily assigned by the user to the lens control ring. For example, as described above, the functions of changing the F-number (aperture value) Av, the shutter speed Tv, the sensitivity (ISO speed) of the image sensor 204, and the exposure correction value are assigned.

In S402, the camera controller 205 that starts this processing in S401 checks whether the bit corresponding to the "control ring" in the corresponding sleep mode of the interchangeable lens 10 acquired in S304 is 1 or not (0). If the bit is 0, it is determined that the interchangeable lens 10 does not correspond to the release of the sleep state by the operation of the lens control ring, and the flow proceeds to S406. In S406, the camera controller 205 sets the bit corresponding to "control ring" to 0 in the sleep mode.

On the other hand, in S402, when the bit corresponding to the "control ring" is 1 in the corresponding sleep mode acquired in S304, the bit corresponding to the "control ring" in the sleep mode can be set to 1. The camera controller 205 proceeds to next S403 in order to determine whether the bit is set to one.

In S403, the camera controller 205 confirms whether or not the function is assigned to the lens control ring in the current setting of the camera body 20 (referred to as a camera setting hereinafter). If no function is assigned to the lens control ring in the camera setting, the camera controller 205 proceeds to S406 and sets the bit corresponding to the "control ring" in the sleep mode to 0. On the other hand, when the function is assigned to the lens control ring in the camera setting, the camera controller 205 proceeds to S404.

In the step S404, the camera controller 205 confirms whether the function assigned to the lens control ring is enabled or not in the imaging mode (referred to as a set imaging mode hereinafter) currently set in the camera body 20. The imaging mode referred to herein is a mode in which imaging is performed by fixing an imaging parameter selected by the user in order to obtain an optimal exposure amount Ev.

The exposure amount Ev can be obtained as in the expression (1) using the F-number Av and the shutter speed Tv, which are imaging parameters.

$$Ev=Av+Tv \quad (1)$$

Examples of the imaging mode include an F-number (Av) priority mode, a shutter speed (Tv) priority mode, a long-time exposure mode (Bulb), etc. If the set imaging mode is the F-number priority mode, Av is a fixed value as designated by the user, and Tv is automatically set according to the luminance of the object in order to obtain the optimum exposure amount (Ev). Thus, in the F-number priority mode, setting of the shutter speed has no meaning. In this case, the shutter speed changing function in the F-number priority mode is expressed as disabled. Similarly, the F-number changing function is disabled in the shutter speed priority mode. On the other hand, when the F-number priority mode or the shutter speed priority mode is selected as the set imaging mode and the F-number changing function is assigned to the lens control ring, the changing function is enabled.

Thus, the camera controller 205 compares the set imaging mode with the function assigned to the lens control ring in S404. If the function assigned to the lens control ring is enabled, the camera controller 205 proceeds to S405 and sets the bit corresponding to "control ring" in the sleep mode to 1. If the function assigned to the lens control ring is disabled, the camera controller 205 proceeds to S406 and sets the bit to 0 which corresponds to the "control ring" in the sleep mode.

After S405 or S406, the camera controller 205 proceeds to S407 and ends this flow.

In this embodiment, the camera body 20 (camera controller 205) acquires the corresponding sleep mode from the interchangeable lens 10 (lens controller 113), and set an appropriate sleep mode to the interchangeable lens 10 from the relationship between the corresponding sleep mode and the camera setting or the set imaging mode. Even when the camera setting is changed in the normal operation state, periodically performing this processing can change the sleep mode in accordance with the change. Thereby, the camera system can be returned from the sleep state to the normal operation state only in response to the operation of the specific operation member in the lens operation unit 116. Since the operation of the operation member other than the specific operation member is not detected, the power consumption of the camera system can be reduced.

Second Embodiment

Next follows a description of a second embodiment according to the present invention. The first embodiment has described the imaging system in which the interchangeable lens 10 is attached to the camera body 20. This embodiment will describe an imaging system in which the intermediate adapter 30 is mounted between the camera body 20 and the interchangeable lens 10. This embodiment will describe one intermediate adapter mounted between the camera body 20 and the interchangeable lens 10, but even when two or more intermediate adapters are mounted, the same processing is applicable so as to set an appropriate sleep mode.

Figure 6:
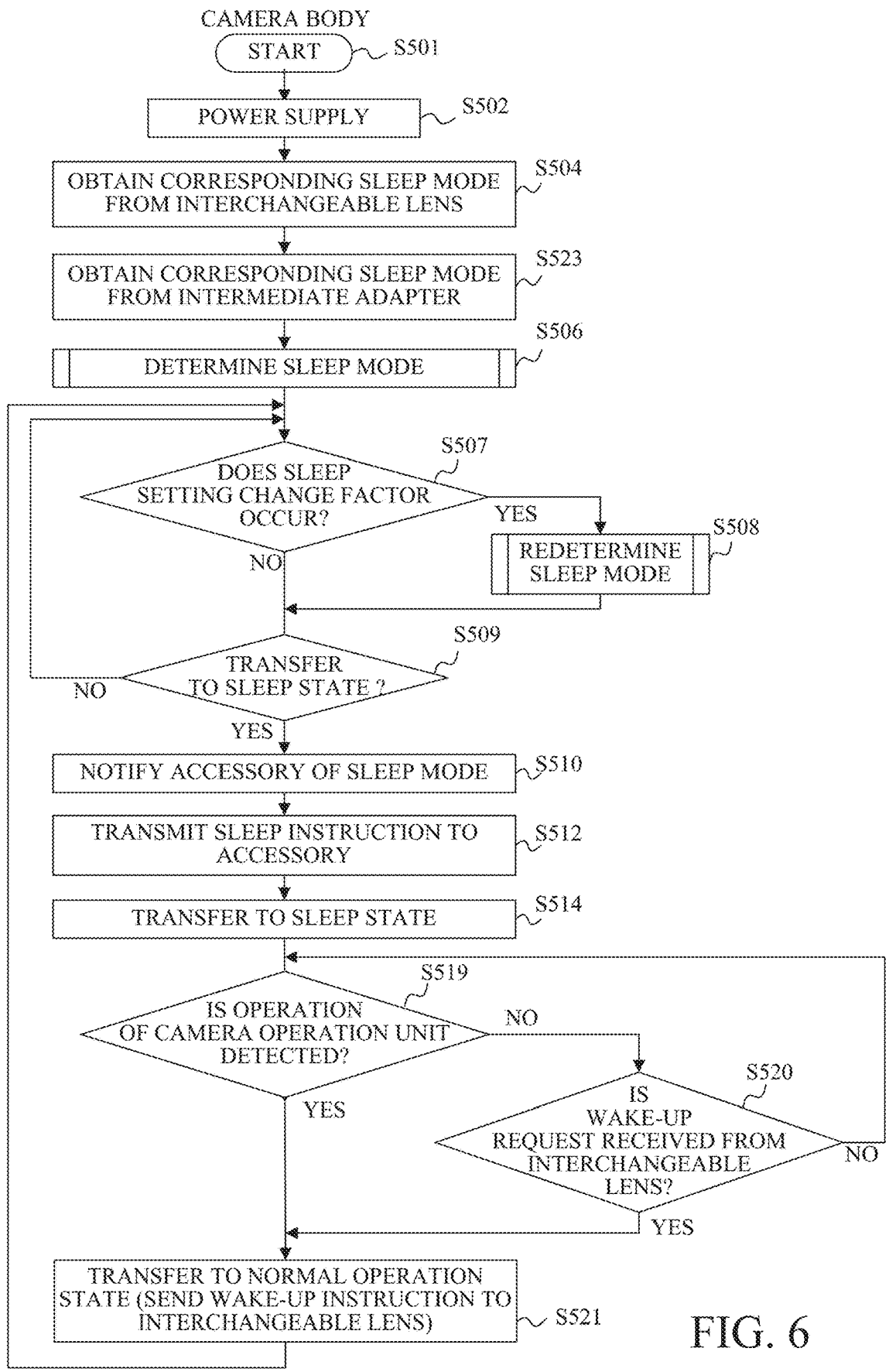
FIG. 6 is a flowchart showing wake-up operation setting processing for a camera body according to a second embodiment of the present invention.
Figure 7:
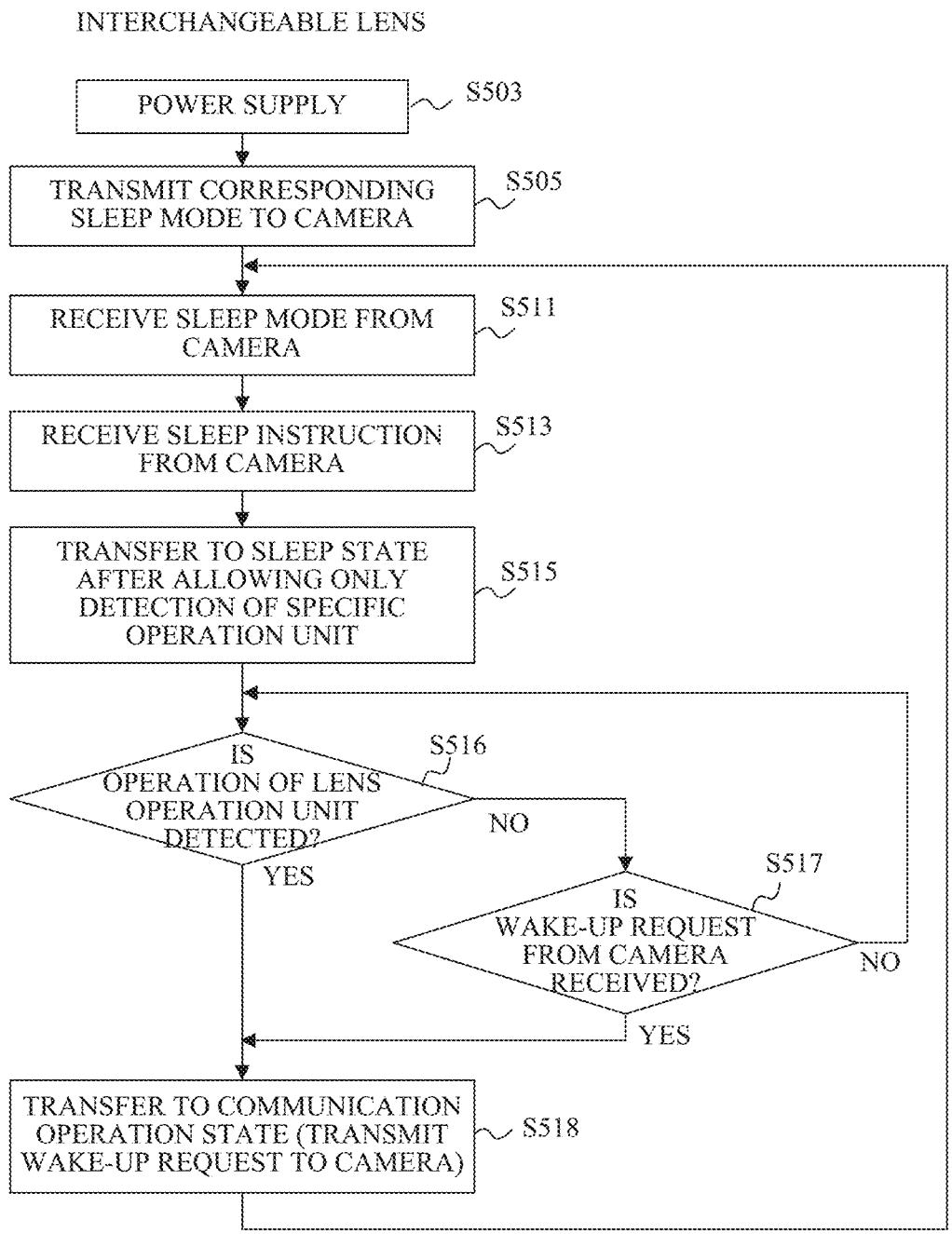
FIG. 7 is a flowchart showing wake-up operation setting processing for an interchangeable lens according to the second embodiment.
Figure 8:
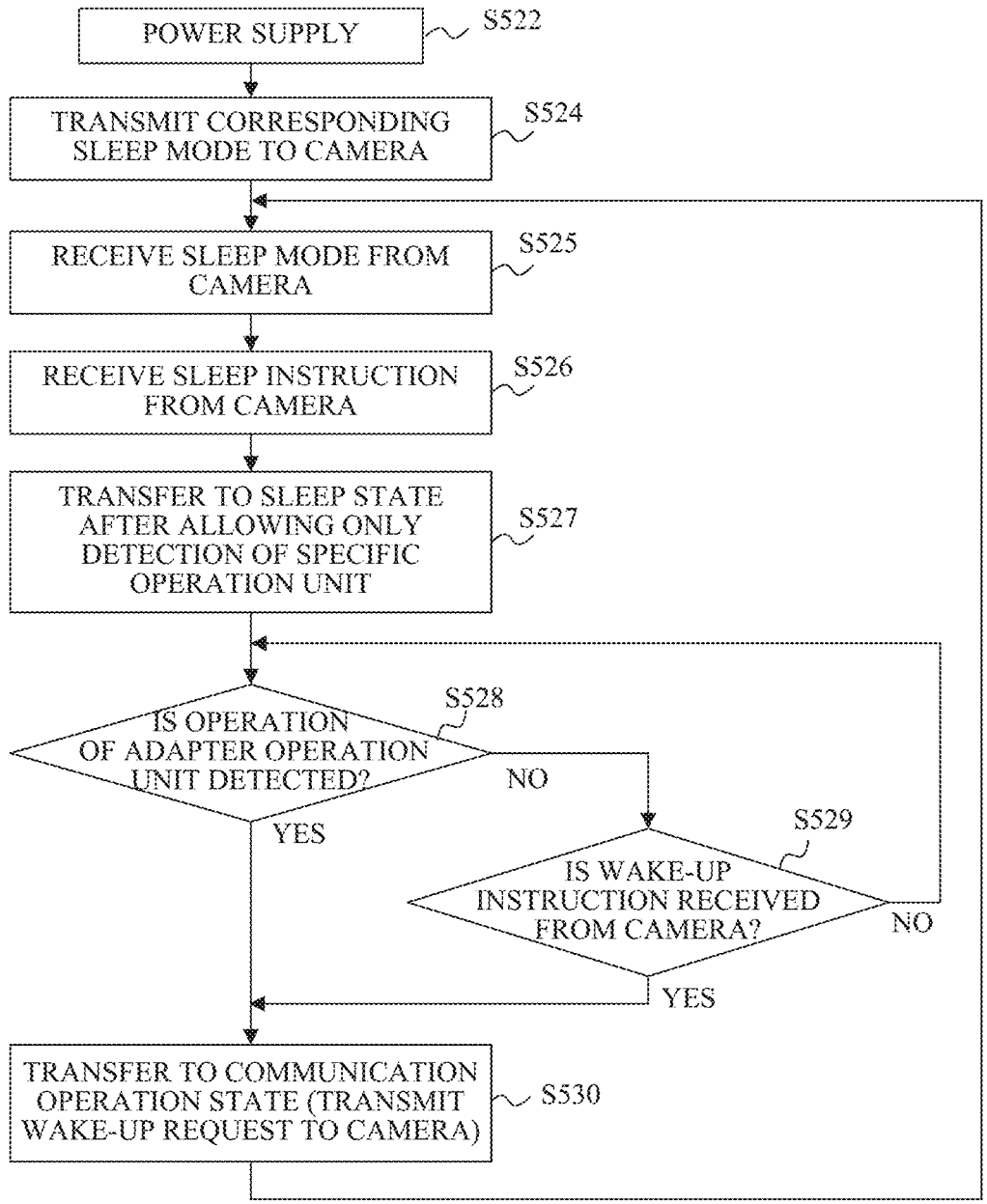
FIG. 8 is a flowchart illustrating wake-up operation setting processing for an intermediate adapter according to the second embodiment.

FIGS. 6, 7, and 8 illustrate a series of processes after the camera body 20 mounted with the intermediate adapter 30 and the interchangeable lens 10 is powered on, and the camera body 20, the intermediate adapter 30, and the interchangeable lens 10 shift to the sleep state and then return to the normal operation state according to the wake-up operation in the intermediate adapter 30 or the interchangeable lens 10.

In S501, as the camera body 20 is powered on, the camera controller 205 proceeds to S502, and supplies the power to the interchangeable lens 10 and the intermediate adapter 30. In S503, the interchangeable lens 10 (lens controller 113) is started by the power supply from the camera body 20. In S522, the interchangeable lens 30 (adapter controller 309) is started by the power supply from the camera body 20.

Next, in S504, the camera controller 205 performs the initial communication with the lens controller 113 through the first communication. In the initial communication, the camera controller 205 acquires, from the lens controller 113, identification (lens ID) information unique to the interchangeable lens 10, lens optical information, and information indicating the function of the interchangeable lens 10. The information indicating the function of the interchangeable lens 10 includes information indicating the functions of the plurality of operation members included in the lens operation unit 116. The information indicating the functions of the plurality of operation members may be included in the lens ID information.

In the initial communication, the camera controller 205 requests the lens controller 113 to transmit the corresponding sleep mode of the interchangeable lens 10. The lens controller 113 that has received the transmission request transmits the corresponding sleep mode to the camera controller 205 in S505. The corresponding sleep mode of the interchangeable lens 10 indicates a specific operation member whose operation is detectable in the sleep state among a plurality of operation members of the interchangeable lens 10 (lens operation unit 116). The expression method in the sleep mode is the same as that described in the first embodiment.

Next, in S523, the camera controller 205 performs the initial communication with the adapter controller 309 through the second communication. In the initial communication, the camera controller 205 acquires, from the adapter controller 309, the identification (adapter ID) information unique to the intermediate adapter 30, the adapter optical information, and the information indicating the function of the intermediate adapter 30. The information indicating the function of the intermediate adapter 30 includes the information indicating the functions of a plurality of operation members included in the adapter operation unit 310. The information indicating the functions of the plurality of operation members may be included in the adapter ID information.

In the initial communication, the camera controller 205 requests the adapter controller 309 to transmit the corresponding sleep mode of the intermediate adapter 30, The adapter controller 309 that has received the transmission request transmits the corresponding sleep mode to the camera controller 205 in S524. The corresponding sleep mode of the intermediate adapter 30 indicates a specific operation member whose operation is detectable in the sleep stale among a plurality of operation members of the intermediate adapter 30 (adapter operation unit 310). The method of expressing the sleep mode is similar to that for the interchangeable lens 10 described in the first embodiment.

The camera controller 205 may sequentially perform the initial communication with the interchangeable lens 10 and the initial communication with the intermediate adapter 30, but the parallel communications using the first and second communication paths can finish the initial communications with the interchangeable lens 10 and the intermediate adapter 30 more quickly.

Next, in S506, the camera controller 205 determines the sleep mode to be set to each of the interchangeable lens 10 and the intermediate adapter 30. In order to determine the sleep mode for the interchangeable lens 10, similar to S306, in addition to the corresponding sleep mode of the interchangeable lens 10 acquired in S504, the function assigned to the plurality of operation members of the lens operation unit 116, and the function determination result such as whether the function is enabled in the current setting of the camera body 20 or the imaging mode is added. In order to determine the sleep mode for the intermediate adapter 30, in addition to the corresponding sleep mode of the intermediate adapter 30 acquired in S523, the function assigned to the plurality of operation members of the adapter operation unit 310, whether the function is enabled in the current setting or the imaging mode, and the function of the interchangeable lens 10 are also added.

Details in S506 will be described later with reference to FIG. 9. At this stage, the camera controller 205 does not notify the lens controller 113 and the adapter controller 309 of the determined sleep mode.

The flow from the next S507 to S509 and back to S507 illustrates processing performed by the camera controller 205 in the normal operation state of the camera system. The camera controller 205 returns to S507 without shifting to the sleep state when the sleep setting change factor described later does not occur in the normal operation state (S507) and when the user's operation on the camera system is performed during the predetermined time (S509).

On the other hand, when the sleep setting change factor occurs in the normal operation state (S507), the camera controller 205 proceeds to S508, redetermines the sleep mode, and proceeds to S509. The sleep setting change factor is an event that needs the redetermination of the sleep mode, such as changing the function of each operation member or the imaging mode after the sleep mode is determined in S506. In the redetermination of the sleep mode for the intermediate adapter 30, the change on the interchangeable lens 10 side, such as the lens exchange or the setting change of the interchangeable lens 10, is also taken into consideration. Depending on the state of the camera system, the sleep mode for the interchangeable lens 10 and the sleep mode for the intermediate adapter 30 may be different from each other.

If the user performs no operation on the camera system for a predetermined time in the normal operation state in S509, the camera controller 205 proceeds to S510.

In S510, the camera controller 205 notifies the lens controller 113 of the sleep mode of the interchangeable lens 10 determined in S506 or S508 through the first communication. The camera controller 205 notifies the adapter controller 309 of the determined sleep mode of the intermediate adapter 3C) by the second communication. The communication amount in the normal operation state can be reduced by notifying them of the sleep mode just before the interchangeable lens 10 and the intermediate adapter 30 shift to the sleep state. The communication in the sleep mode from the camera controller 205 to the lens controller 113 and the adapter controller 309 is completed in a shorter time through parallel communications using the first and second communication paths.

Next, in S511, the lens controller 113 that has received the notice of the sleep mode from the camera controller 205 compares the notified sleep mode with its corresponding sleep mode. The adapter controller 309 that has received the notice of the sleep mode from the camera controller 205 in S525 compares the notified sleep mode with its corresponding sleep mode. If the notified sleep mode (or the specific operation member) accords with its corresponding sleep mode, the lens controller 113 and the adapter controller 309 respectively set the notified sleep mode to the current sleep modes in the interchangeable lens 10 and the intermediate adapter 30. At this time, the lens controller 113 and the adapter controller 309 may return a response, such as an ACK, to the camera controller 205.

When the sleep mode for the interchangeable lens 10 is normally set in S511, the camera controller 205 proceeds to S512 and transmits a sleep instruction as a transfer instruction from the normal operation state to the sleep state to the lens controller 113 and the adapter controller 309. In S513 and S526, the lens controller 113 and the adapter controller 309 receive the sleep instruction. At this time, the lens controller 113 and the adapter controller 309 may return a response, such as an ACK, to the camera controller 205.

In S514 following S512, the camera controller 205 shifts from the normal operation state to the sleep state. The lens controller 113 and the adapter controller 309 shift to the sleep state in the notified sleep mode from the normal operation state in S515 and S527, respectively. At this time, each of the lens controller 113 and the adapter controller 309 can only detect the operation of the specific operation member designated in the sleep mode among the plurality of operation members included in the lens operation unit 116 and the adapter controller 309, respectively, and then transfers to the sleep state. In other words, the lens controller 113 and the adapter controller 309 do not detect an operation of an operation member other than the specific operation member in the sleep state.

On the other hand, when the operation of any operation members in the camera operation unit 209 is detected in S519, the camera controller 205 that has shifted to the sleep state in S514 proceeds to S521 and returns from the sleep state to the normal operation state. At this time, the camera controller 205 transmits a wake-up instruction to the lens controller 113 through the first communication, and transmits the wake-up instruction to the adapter controller 309 through the second communication.

Each of the lens controller 113 and the adapter controller 309 in the sleep state maintains the sleep state until they detect the operation of the specific operation member in S516 and S528 or receive the wake-up instruction from the camera controller 205 in S517 and S529, respectively.

For example, the lens controller 113 that has detected the operation of the specific operation member in S516 proceeds to S518, and shifts from the sleep state to the normal operation state. At this time, the lens controller 113 transmits a wake-up request to the camera controller 205 through the first communication.

The wake-up request may request the camera controller 205 for a communication. In addition to transmitting the wake-up request (or communication request), the camera controller 205 may be requested for a wake-up instruction (or communication) by changing the signal level of the first communication path from the sleep state. In S517, the lens controller 113 that has received the wake-up instruction from the camera controller 205 proceeds to S518, and shifts from the sleep state to the normal operation state. After S518, the lens controller 113 returns to S511.

If the operation of any operation members in the camera operation unit 209 is not detected in S519, the camera controller 205 proceeds to S520 and determines whether a wake-up request has been received from the lens controller 113. If the camera controller 205 receives the wake-up request from the lens controller 113, the flow proceeds to S521 to return from the sleep state to the normal operation state.

In S521, the camera controller 205 transmits the wake-up instruction to the adapter controller 309. Herein, since the camera controller 205 has returned to the normal operation state in response to the wake-up request from the lens controller 113, it is known that the interchangeable lens 10 is already in the normal operation state. Thus, the camera controller 205 transmits the wake-up instruction to the intermediate adapter 30 (adapter controller 309) that is still in the sleep state, using the second communication.

The adapter controller 309 that has received the wake-up instruction from the camera controller 205 in S529 returns from the sleep state to the normal operation state. Then, the adapter controller 309 returns to S525. Thereafter, the camera controller 205 returns to S507.

Where the adapter controller 309 detects the operation of the specific operation member in S528 prior to the lens controller 113 and the adapter controller 309 returns from the sleep state to the normal operation state in S530, the adapter controller 309 sends the wake-up request to the camera controller 205.

The wake-up request may request the camera controller 205 for the communication. The wake-up request (or communication request) can be notified by a change in the signal level of the CS signal line. For example, a predetermined time after the adapter controller 309 changes the signal level of the CS signal line from the high level to the low level, the signal level may be changed to the high level again to notify the wake-up request (or communication request).

The camera controller 205 that has received the wake-up request from the adapter controller 309 in S520 returns to the normal operation state in S521, and transmits the wake-up instruction to the lens controller 113 by the first communication to return to the normal operation state.

When a plurality of intermediate adapters are mounted between the camera body 20 and the interchangeable lens 10 as illustrated in FIG. 1, the camera controller 205 transmits the wake-up instruction through the second communication to the intermediate adapter that is still in the sleep state to restore it to the normal operation state.

The lens controller 113 that has received the wake-up instruction from the camera controller 205 in S517 returns from the sleep state to the normal operation state. Then, the lens controller 113 returns to S511. Thereafter, the camera controller 205 returns to S507.

Figure 9:
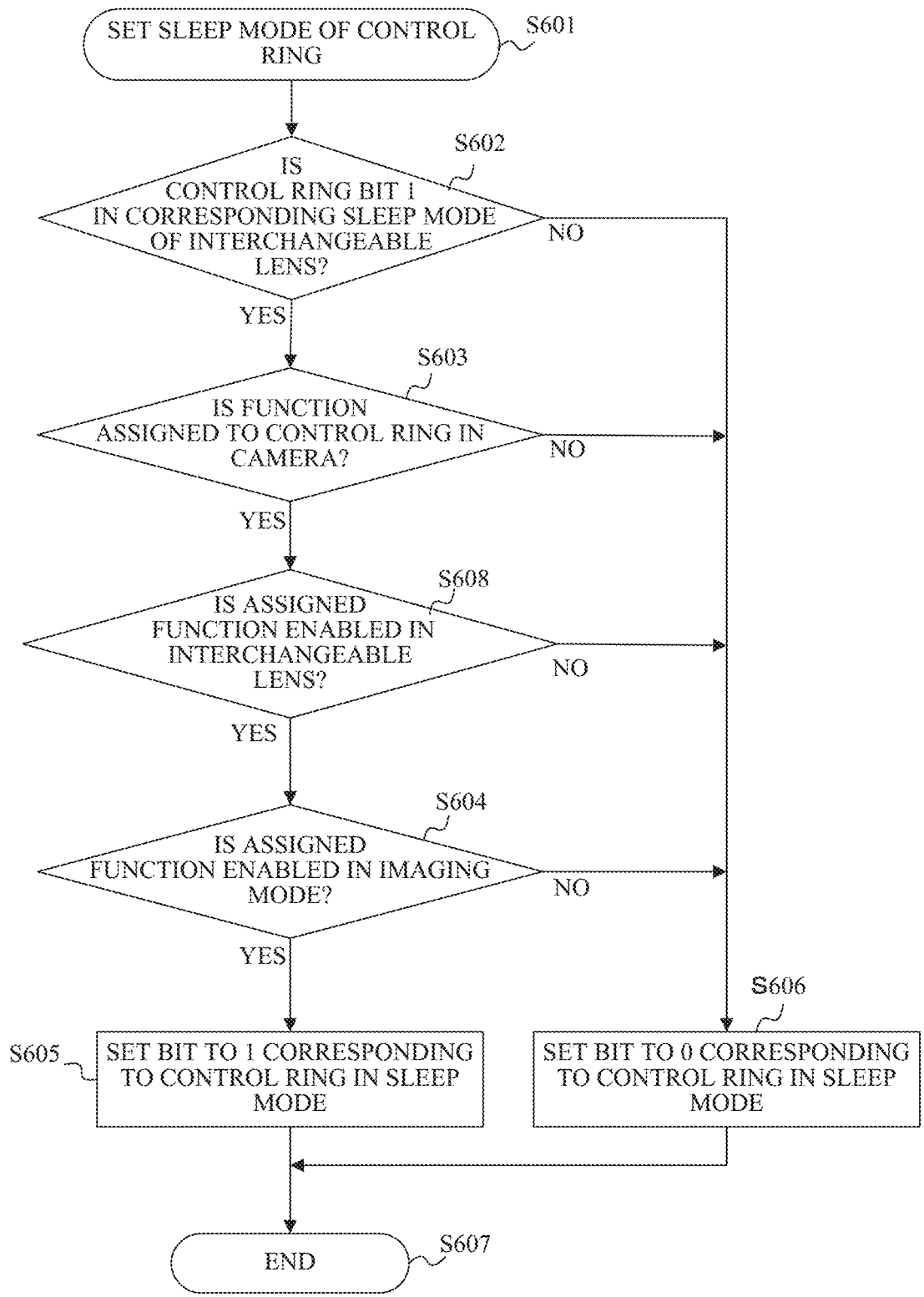
FIG. 9 is a flowchart illustrating sleep mode determination processing according to the second embodiment.

Referring now to FIG. 9, a description will be given of processing of determining the sleep mode in S506 as an example in which the electronic control ring of the intermediate adapter 30 (referred to as an adapter control ring hereinafter) is designated as the specific operation member. This processing determines whether to set 1 or 0 to the bit corresponding to the "control ring" in the sleep mode for the intermediate adapter 30, based on the current setting of the camera body 20 or the like. The processing of determining the sleep mode for the interchangeable lens 10 is the same as that described with reference to FIG. 5 in the first embodiment.

The function of changing the user selectable camera setting is arbitrarily assigned to the adapter control ring by the user. For example, the functions of changing the F-number Av, the shutter speed Tv, the sensitivity (ISO speed) of the image sensor 204, and the exposure correction value are assigned.

In S602, the camera controller 205 that starts this processing in S601 confirms whether the bit corresponding to the "control ring" in the corresponding sleep mode of the intermediate adapter 30 acquired in S504 is 1 or not (0). If the bit is 0, the intermediate adapter 30 determines the incompatibility of the release of the sleep state by the operation of the electronic control ring, and the flow proceeds to S606. In S606, the camera controller 205 sets the bit corresponding to the "control ring" in the sleep mode to 0.

On the other hand, if the bit corresponding to the "control ring" in the corresponding sleep mode acquired in S504 is 1 in S602, the bit corresponding to the "control ring" in the sleep mode can be set to 1. The camera controller 205 proceeds to the next S603 so as to determine whether the bit is set to 1.

In S603, the camera controller 205 confirms whether or not the function is assigned to the adapter control ring in the current setting (camera setting) of the camera body 20. If no function is assigned to the adapter control ring in the camera setting, the camera controller 205 proceeds to S606 and sets the bit corresponding to the "control ring" in the sleep mode to 0. On the other hand, when the function is assigned to the adapter control ring in the camera setting, the camera controller 205 proceeds to S608.

In S608, the camera controller 205 confirms whether the function assigned to the adapter control ring is enabled or disabled in the currently mounted interchangeable lens. Among the operations of the operation member in the accessory other than the interchangeable lens, such as the intermediate adapter, the operation associated with the function of the interchangeable lens is disabled when the interchangeable lens incompatible with the function is mounted.

Examples of the functions assigned to the adapter control ring being disabled in the interchangeable lens include, for example, as follows. In the interchangeable lens having an operation system in which the operation of the operation member for changing the F-number is directly transmitted to the diaphragm unit by a gear or the like, the F-number changing function is assigned to the adapter control ring. When the interchangeable lens having such an operation system for the diaphragm unit notifies the camera body of the function of the interchangeable lens, it notifies that it is not compatible with the diaphragm driving request from the camera body.

The function of the interchangeable lens is acquired at the timing when the corresponding sleep mode is acquired in S504. If the function assigned to the adapter control ring is disabled in the interchangeable lens, the camera controller 205 proceeds to S606 and sets the bit corresponding to the "control ring" in the sleep mode to 0. On the other hand, if the function is enabled in the interchangeable lens, the camera controller 205 proceeds to S604.

In S604, the camera controller 205 confirms whether the function assigned to the adapter control ring is enabled or disabled in the imaging mode (set imaging mode) currently set in the current camera body 20. The imaging mode referred to herein is the same as that of the first embodiment.

If the function assigned to the adapter control ring is enabled, the camera controller 205 proceeds to S605 and sets the bit corresponding to the "control ring" in the sleep mode to 1. If the function assigned to the adapter control ring is disabled, the camera controller 205 proceeds to S606 and sets the bit corresponding to the "control ring" in the sleep mode to 0.

After S605 or S606, the camera controller 205 proceeds to S607 and ends this flow.

In this processing, the camera body 20 (camera controller 205) acquires the corresponding sleep mode from the interchangeable lens 10 (lens controller 113) and sets the appropriate sleep mode to the interchangeable lens 10 based on the relationship among the corresponding sleep mode, the camera setting, and the set imaging mode. Periodically perforating this processing can change the sleep mode in accordance with the change of the camera setting in the normal operation state. Thereby, the camera system can be returned from the sleep state to the normal operation state only in response to the operation of the specific operation member in the lens operation unit 116. Since the operation of the operation member other than the specific operation member is not detected, the power consumption of the camera system can be reduced.

While this embodiment discusses one attached intermediate adapter, the same processing is performed to properly set the sleep mode for each intermediate adapter even when a plurality of intermediate adapters are attached. When a plurality of intermediate adapters share the second communication for the communication with the camera body, the camera body which has returned to the normal operation state in response to the wake-up request from the intermediate adapter in S530 returns the interchangeable lens in the sleep state to the normal operating state using the first communication in S521. The camera body restores the intermediate adapter in the sleep state to the normal operation state using the second communication. When the intermediate adapter communicates the wake-up request with the camera body, the intermediate adapter in the sleep state may detect the wake-up request and return to the normal operation state.

In this embodiment, the camera body 20 (camera controller 205) acquires the corresponding sleep anode from the interchangeable lens 10 (lens controller 113) and the intermediate adapter 30 (adapter controller 309). Then, the camera body 20 sets an appropriate sleep mode to the interchangeable lens 10 and the intermediate adapter 30 based on the relationship among the corresponding sleep mode, the camera setting, and set imaging mode. Even when the camera setting is changed in the normal operation state, periodically performing this processing can change the sleep mode in accordance with the change of the camera setting. Thereby, the camera system can be returned from the sleep state to the normal operation state only in response to the operation of the specific operation member in the lens operation unit 116 or the adapter operation unit 310. Since the operation of the operation member other than the specific operation member is not detected, the power consumption of the camera system can be reduced.

Third Embodiment

Next follows a description of a third embodiment according to the present invention. Depending on the battery capacity, the power saving setting of the camera body 20, etc., it may be necessary to give priority to reducing the power consumption of the accessory (such as the interchangeable lens 10 and the intermediate adapter 30), In that case, it is unnecessary to inquire the accessory on the corresponding sleep mode, and the accessory may be notified of the sleep mode in which all bits are 0.

More specifically, FIGS. 6 and 7 of the second embodiment may omit S504, S523, S506, S507 and S508, and transmit the sleep mode in which all bits are set to 0 to the accessory in S510. In this case, since the sleep mode to be transmitted to the accessory is unchanged, the notice to the accessory in the sleep mode in S510 may be performed before the transfer to the sleep state in S509. However, the accessory needs to be compatible with the sleep mode notice from the camera body 20. Thus, the camera body 20 acquires information on the function from the accessory, confirms that the accessory is compatible with the communication, and then transmits the sleep mode in which all bits are set to 0 to the accessory.

In this embodiment, the camera body does not acquire the corresponding sleep mode from the accessory and determines the sleep mode for the accessory when it is determined in advance that all the bits in the sleep mode are set to 0 so as to make minimum the power consumption etc. This configuration can provide a camera system that can suppress the power consumption of the accessory.

While the first and second embodiments describe an example in which the lens controller 113 does not detect the operation other than the specific operation member when the interchangeable lens 10 is in the sleep state, the operation may be detected other than the specific operation member and the wake-up request may not be sent. Even this method can provide the effect of suppressing the skin power of the camera body. The second embodiment has described the example in which the adapter controller 309 does not detect an operation other than the specific operation member when the intermediate adapter 30 is in the sleep state, but may detect the operation other than the specific operation member and may not transmit the wake-up request. This method can also provide the effect of suppressing the power consumption of the camera body.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-121914, filed on Jun. 27, 2018, Which is hereby incorporated by reference herein in its entirety.

What is claimed is:

1. An imaging apparatus to which an accessory apparatus including a plurality of operation members is detachably attached, the imaging apparatus comprising:
at least one memory configured to store instructions; and
at least one processor communicatively connected to the at least one memory and configured to execute the stored instructions to function as:
a camera communicator configured to provide a communication path with the accessory apparatus; and
a camera controller configured to communicate with the accessory apparatus via the camera communicator, and to transfer to a sleep state with the accessory apparatus when none of the accessory apparatus and the imaging apparatus are operated in a normal operation state,
wherein the camera controller designates a specific operation member among a plurality of operation members for the accessory apparatus, and
wherein the camera controller in the sleep state returns to the normal operation state when receiving a communication from the accessory apparatus corresponding to an operation of the specific operation member, and does not return to the normal operation state when an operation member other than the specific operation member among the plurality of operation members is operated.

2. The imaging apparatus according to claim 1, wherein the camera controller acquires information indicating a function of each of the plurality of operation members from the accessory apparatus, and
wherein the camera controller sets, to the specific operation member, one of the plurality of operation members, which has a function effective to the imaging apparatus.

3. The imaging apparatus according to claim 1, wherein the communication corresponding to the operation of the specific operation member is a request to release the sleep state of the imaging apparatus or a request to communicate with the imaging apparatus.

4. The imaging apparatus according to claim 1, wherein the camera controller in the sleep state accepts the communication from the accessory apparatus corresponding to the operation of the specific operation member, and does not accept a communication corresponding to the operation of the operation member other than the specific operation member among the plurality of operation members.

5. An accessory apparatus attachable to and detachable from an imaging apparatus and including a plurality of operation members, the accessory apparatus comprising:
at least one memory configured to store instructions; and
at least one processor communicatively connected to the at least one memory and configured to execute the stored instructions to function as:
an accessory communicator configured to provide a communication path with the imaging apparatus; and
an accessory controller configured to communicate with the imaging apparatus via the accessory communicator, and to transfer to a sleep state when receiving a sleep instruction from the imaging apparatus in a normal operation state,
wherein the accessory controller receives a designation of a specific operation member among the plurality of operation members from the imaging apparatus, and
wherein the accessory controller in the sleep state performs, when detecting an operation of the specific operation member, a communication for returning the imaging apparatus from the sleep state to the normal operation state.

6. The accessory apparatus according to claim 5, wherein the accessory controller transmits information on a function of each of the plurality of operation members to the imaging apparatus.

7. The accessory apparatus according to claim 5, wherein a communication corresponding to the operation of the specific operation member is a request to release the sleep state of the imaging apparatus or a request to communicate with the imaging apparatus.

8. The accessory apparatus according to claim 5, wherein the accessory controller in the sleep state does not perform the communication for returning the imaging apparatus to the normal operation state when an operation member other than the specific operation member among the plurality of operation members is operated.

9. The accessory apparatus according to claim 8, wherein the accessory controller in the sleep state does not detect an operation of an operation member other than the specific operation member among the plurality of operation members.

10. An imaging system comprising an accessory apparatus that includes a plurality of operation members, and an imaging apparatus to which the accessory, apparatus is detachably attached, wherein the imaging apparatus includes:

at least one memory configured to store instructions; and at least one processor communicatively connected to the at least one memory and configured to execute the stored instructions to function as:

a camera communicator configured to provide a communication path with the accessory apparatus; and a camera controller configured to communicate with the accessory apparatus via the camera communicator, to transfer to a sleep state when none of the accessory apparatus and the imaging apparatus are operated in a normal operation state, and to transmit a sleep instruction to the accessory apparatus, wherein the accessory apparatus includes:

at least one memory configured to store instructions; and at least one processor communicatively connected to the at least one memory and configured to execute the stored instructions to function as:

an accessory communicator configured to provide a communication path with the imaging apparatus; and an accessory controller configured to communicate with the imaging apparatus via the accessory communicator, and to transfer to a sleep state when receiving the sleep instruction from the imaging apparatus in the normal operation state, wherein the camera controller designates a specific operation member among a plurality of operation members for the accessory apparatus, wherein the accessory controller in the sleep state communicates with the imaging apparatus in the sleep state, when detecting an operation of the specific operation member, and wherein the camera controller in the sleep state returns to the normal operation state when receiving the communication from the accessory apparatus corresponding to an operation of the specific operation member, and does not return to the normal operation state when an operation member other than the specific operation member among the plurality of operation members is operated.

11. A control method of an imaging apparatus to which an accessory apparatus including a plurality of operation members is detachably and communicatively attached, the control method comprising the steps of:

designating a specific operation member among the plurality of operation members in the accessory apparatus;

transferring to a sleep state with the accessory apparatus when none of the accessory apparatus and the imaging apparatus are operated in a normal operation state; and returning from the sleep state to the normal operation state by receiving a communication from the accessory apparatus corresponding to an operation of the specific operation member in the sleep state, and not returning from the sleep state to the normal operation state when an operation member other than the specific operation member among the plurality of operation members is operated.

12. A control method of an accessory apparatus detachably and communicatively attached to an imaging apparatus and including a plurality of operation members; the control method comprising the steps of:

receiving a designation of a specific operation member among the plurality of operation members from the imaging apparatus;

transferring to the sleep state by receiving a sleep instruction from the imaging apparatus in a normal operating state; and performing a communication for returning the imaging apparatus from the sleep state to the normal operation state by detecting an operation of the specific operation member in the sleep state.

13. A non-transitory storage medium storing a computer program for causing an imaging apparatus to which an accessory apparatus having a plurality of operation members is detachably and communicably attached, to execute processing in accordance with a control method, wherein the control method includes the steps of:

designating a specific operation member among the plurality of operation members in the accessory apparatus;

transferring to a sleep state with the accessory apparatus when none of the accessory apparatus and the imaging apparatus are operated in a normal operation state; and returning from the sleep state to the normal operation state by receiving a communication from the accessory apparatus corresponding to an operation of the specific operation member in the sleep state, and not returning from the sleep state to the normal operation state when an operation member other than the specific operation member among the plurality of operation members is operated.

14. A non-transitory storage medium storing a computer program for causing an accessory apparatus detachably and communicatively attached to an imaging apparatus and including a plurality of operation members, to execute processing in accordance with a control method, wherein the control method includes the steps of:

receiving a designation of a specific operation member among the plurality of operation members from the imaging apparatus;

transferring to the sleep state by receiving a sleep instruction from the imaging apparatus in a normal operating state; and performing a communication for returning the imaging apparatus from the sleep state to the normal operation state by detecting an operation of the specific operation member in the sleep state.

* * * * *